(12) United States Patent
Harding

(10) Patent No.: US 6,307,544 B1
(45) Date of Patent: *Oct. 23, 2001

(54) METHOD AND APPARATUS FOR DELIVERING A DYNAMIC CONTEXT SENSITIVE INTEGRATED USER ASSISTANCE SOLUTION

(75) Inventor: Andrew R. Harding, Scotts Valley, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,637

(22) Filed: Jul. 23, 1998

(51) Int. Cl.[7] .................................................. G06F 3/00
(52) U.S. Cl. ............................................. 345/338; 345/353
(58) Field of Search .................................. 345/338, 336, 345/337, 326, 333, 334, 335, 339, 346, 347, 352, 353; 707/10

(56) References Cited

U.S. PATENT DOCUMENTS

| | | | |
|---|---|---|---|
| 4,970,678 | | 11/1990 | Sladowski et al. ................ 707/531 |
| 5,122,972 | * | 6/1992 | Richards et al. .................. 345/338 |
| 5,239,617 | * | 8/1993 | Gardner et al. ................... 706/11 |
| 5,287,448 | * | 2/1994 | Nicol et al. ....................... 345/337 |
| 5,361,361 | * | 11/1994 | Hickman et al. ................. 395/703 |
| 5,442,759 | * | 8/1995 | Chiang et al. .................... 705/1 |
| 5,477,447 | * | 12/1995 | Luciw et al. ..................... 704/9 |
| 5,535,323 | * | 7/1996 | Miller et al. ..................... 345/338 |
| 5,546,521 | * | 8/1996 | Martinez .......................... 345/338 |
| 5,581,684 | * | 12/1996 | Dudzik et al. .................... 345/338 |
| 5,621,903 | * | 4/1997 | Luciw et al. ..................... 345/326 |
| 5,682,469 | * | 10/1997 | Linnett et al. .................... 345/473 |
| 5,715,415 | * | 2/1998 | Dazey et al. ..................... 345/338 |
| 5,727,174 | * | 3/1998 | Aparicio, IV et al. ........... 345/348 |
| 5,748,927 | * | 5/1998 | Stein et al. ....................... 345/333 |
| 5,877,757 | * | 3/1999 | Baldwin et al. .................. 345/336 |
| 5,933,139 | * | 8/1999 | Feigner et al. ................... 345/338 |
| 5,933,140 | * | 8/1999 | Strahorn et al. .................. 345/338 |
| 5,949,416 | * | 9/1999 | Bush ................................. 345/338 |
| 5,982,365 | * | 11/1999 | Garcia et al. ..................... 345/336 |
| 5,995,101 | * | 11/1999 | Clark et al. ...................... 345/338 |
| 6,021,403 | * | 2/2000 | Horvitz et al. ................... 706/45 |
| 6,088,731 | * | 7/2000 | Kiraly et al. ..................... 709/229 |

OTHER PUBLICATIONS

E. Anchell and A.E. Martinez "Progressive Disclosure of User Assistance Information", IBM Technical Disclosure Bulletin, vol. 39 No. 02, Feb., 1996, p. 395.

"An Introduction to the Office Assistant", Excerpt from Microsoft Word 97, Microsoft Press, Copyright 1997, p. 5.

"Oracle Help for Java", Excerpt from Oracle on the World Wide Web, Nov. 17, 1997, pp. 1–9.

"PHelp.class", Excerpt from primosoft on the World Wide Web, Apr. 23, 1998, p. 1.

"Software Patent Institute Database of Software Technologies", Excerpt from SPI on the World Wide Web, Jan., 1998, pp. 1–3.

"Software Patent Institute Database of Software Technologies", Excerpt from SPI on the World Wide Web, Nov., 1997, pp. 1–3.

"What is the JMAPI Help System!", Excerpt from Java.Sun on the World Wide Web, Copyright 1996, pp. 1–14.

* cited by examiner

Primary Examiner—Crescelle N. dela Toore
(74) Attorney, Agent, or Firm—Sughrue, Mion, Zinn, Macpeak & Seas, PLLC

(57) ABSTRACT

Proactive and dynamic assistance is provided to a user of a computer system. In particular, the present invention provides a navigation model that integrates help information, task guide information, interactive wizard information or other user assistance information, for example, into a single user assistance system. Additionally, code for the user assistance system is maintained separately from code for an application program for the computer system.

45 Claims, 3 Drawing Sheets

METHOD AND APPARATUS FOR DELIVERING A DYNAMIC CONTEXT SENSITIVE INTEGRATED USER ASSISTANCE SOLUTION

BACKGROUND OF THE INVENTION

1. Field of the Invention

The present invention relates to proactively and dynamically providing context sensitive assistance information to a user of a computer system, while maintaining assistance code separate from application code on the computer system.

2. Description of the Related Art

Today, most applications utilizing windows have at least three disparate ways to deliver help: (1) The user can select a help menu item from a window's menu bar; (2) The user can press a help button in a dialog window; and (3) The user can cause hover help to be displayed when a mouse event occurs over a Graphical User Interface (GUI) control, i.e. the user pauses the mouse over a GUI control for a predetermined length of time.

Traditionally, these three help delivery avenues are not interconnected. One path knows nothing about the others. A user is left to his or her own devices to connect the three help delivery avenues into a cohesive "help system." Furthermore, these three avenues pose additional problems that make it more difficult for a user to complete tasks.

First, the help menu leaves a user to wade through different views of the help system. Usually these views or "Help topics" are modeled as "contents," "index" or "find." The contents view, which provides a user with a table of contents, can flood a user with too many choices. This leaves a user with too great an information burden. The index view depends on the help system author to create index entries in exactly the way a user expects the entries to be indexed. Sometimes help topics are indexed in a manner that models the application's design, but not in a way that parallels user tasks. This makes it difficult for the user to find the help topic of interest. Research has shown that the find view, which uses a search engine to find help topics containing a specified string, is often not useful. A user's success with the find view depends upon his or her ability to formulate a search query using terms which exactly match the help topics indexed by the help engine for the search engine.

Second, the help button gives a user specific procedural information about a window, but does not give a user a way to see related information that may be contained in soft copy books. Furthermore, the help button does not provide a direct path to information of different types, such as tips, concepts, and examples.

Third, hover help gives a user a short, plain text description of an object, but does not help the user beyond that. Leaving a user at such an information dead-end, without the ability to see related information or different information types, reduces the usability of applications.

Such prior systems fail to provide standardized context sensitive user assistance which is both dynamic and proactive. This problem is especially significant in Java™ applications, where there is not currently a standard for context sensitive help. Such prior systems also rely on hard coded identifiers to call up the various user help views, where the code for user help is integrated with the application code. Furthermore, such systems, in the help context, fail to integrate the concepts of the help menu, help button and hover help.

SUMMARY OF THE INVENTION

The present invention overcomes these and other shortcomings of prior systems, through an improved method, apparatus and article of manufacture for providing proactive and dynamic context sensitive assistance information to a user of a computer system. The present invention operates on a retrospective context sensitivity basis. For example, in accordance with the present invention, when an assistance window is created, the assistance system manager looks back at the application that created the assistance window and determines the context. Thus, the assistance system manager dynamically figures out the context, unlike traditional help systems, which wait to be told their context.

Additionally, the present invention provides a navigational model that integrates help information, task guide information, interactive wizard information or other user assistance information, for example, into a single user assistance system. The present invention also relies upon a repository to provide assistance information definitions, and further provides information in the form of various information types or categories. Furthermore, in accordance with the present invention, code for the user assistance portion of the system is independent from code for the application running on the computer system. This allows the user assistance code to be dynamically updated without having to also update copious amounts of application code.

BRIEF DESCRIPTION OF THE DRAWINGS

The above objects and advantages of the present invention will become more apparent by describing, in detail, preferred embodiments thereof with reference to the attached drawings in which.

DETAILED DESCRIPTION OF THE INVENTION

Figure 1:
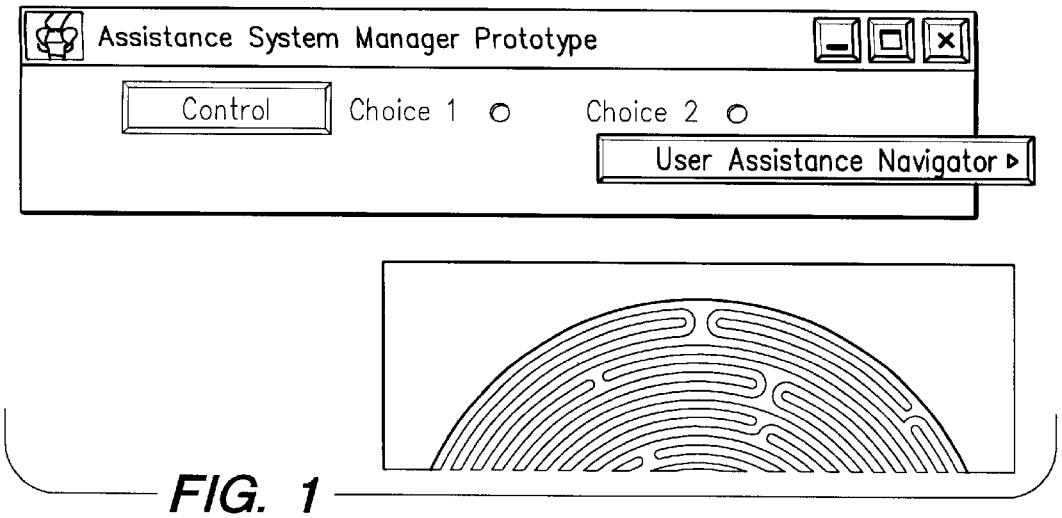
FIG. 1 shows a screen capture presenting an example initial user assistance window.

A preferred embodiment of the present invention is described below in detail with reference to the accompanying drawings. The present invention will be described in the context of a Java™ application, where the Extensible Markup Language (XML) is used for defining help file definitions. However, it is to be understood that the present invention is widely applicable to providing user assistance in a wide variety of applications, where the help file definitions may be defined using many different marking languages or, alternatively, where the help file definitions could be stored in a Database Management System (DBMS). Additionally, while the discussion herein is presented in the context of the help information type of user assistance, the present invention is not so limited and may be applied to a wide variety of user assistance systems, including task guides and interactive wizards.

In accordance with the present invention the following functionality may be provided without having to code application objects in the application code. Thus, according to the present invention, rather than waiting for a user to encounter a problem and waiting still longer for the user to request help, the user is provided with a proactive offer of assistance in the form of a series of pop-up assistance windows. The assistance windows provide a progressively disclosed view of a help system, for example. Progressive disclosure allows the system to help some users with just a short tip. Other users can be shown successively more detailed units of information to satisfy their help information needs.

Prior systems, such as hover help, simply offer a short text description of a help topic when a user's mouse pointer enters a control area. Subsequently, the user is left to ask for additional help on his or her own. Such systems do not progress to another level of disclosure. By contrast, the assistance windows of the present invention provide a direct link from the pop-up assistance windows to other levels of information. In other words, assistance windows provide a way to extend the text, and display selectable (e.g. clickable) menus, allowing a user to launch other applications or applets from them. The assistance windows additionally enhance the concept of hover help in that they show different views of the help system based upon (1) the location of the user within the GUI, thereby providing context sensitivity, and (2) information provided in Assistance Object Definitions stored in a definition repository, a concept lacking in prior systems. Essentially, the present invention provides a way to model an entire application from a user assistance perspective. Different views of the entire help system are displayed, depending upon different properties, which may be user defined or generated by the application.

The present invention can also be distinguished from prior information pop-up windows, which were merely clickable forms of hover help. Such prior pop-up windows show text and menus and rely on hard coded identifiers. However, they fail to provide information types, discussed in further detail below, fail to incorporate the definition repository concept, fail to dynamically build help or assistance identifiers or definitions and fail to separate user assistance code from the application code. The present invention provides these features and others, as well. In accordance with the present invention, the separate user assistance code includes the entire user assistance navigation model (i.e. assistance object definitions). Since the user assistance code is distinct from the application code, it is possible to dynamically update the user assistance navigation model. This is done by changing the content of the assistance objects (e.g. by changing the associated definitions in the information repository) without having to change the application code. Such separation of code further enables user assistance authors to update the user assistance system without extensive involvement from application code developers.

Figure 2:
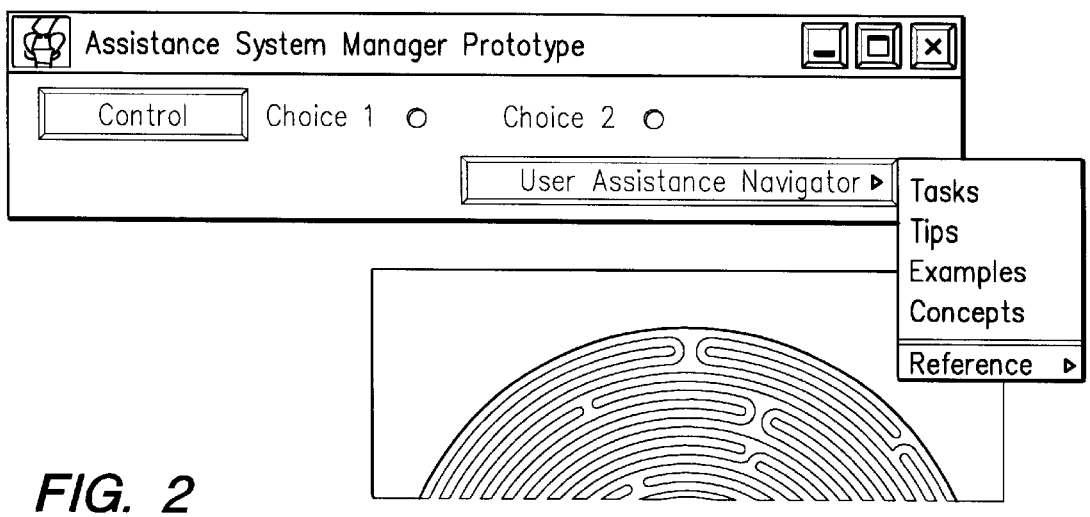
FIG. 2 shows a screen capture presenting a primary menu in the example of a user assistance window.

In accordance with the present invention, initially, the system detects when a user might be in need of assistance. The need for user assistance might be indicated by a user's mouse entering a field and hovering for a moment, thereby signaling a pause and potential confusion. Alternatively, the need for user assistance might be indicated by a user's mouse-event (e.g. entering a GUI window, exiting a GUI window, clicking on a GUI window, etc.). Other means of detecting the need for assistance are also possible. In any case, once the system detects the need for user assistance, an assistance window appears and offers assistance, similar to that provided by hover help. This is shown in FIG. 1. If the user does not require further information, the user can dismiss the assistance window and continue working. If, however, the user needs more information, he or she can place the mouse pointer over the assistance window. This action will cause the assistance to progress to the next level of disclosure, providing a cascading menu, which may be a menu of information types, for example, as shown in FIG. 2.

Figure 3:
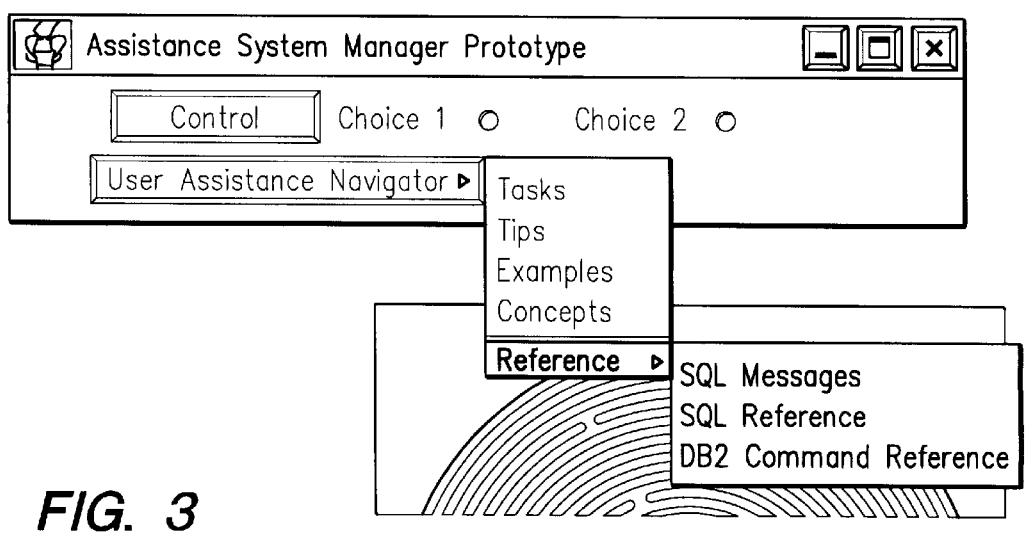
FIG. 3 shows a screen capture presenting cascading, progressive menus in the example of a user assistance window.

Information types are categories of information that might be of interest to a user, for which the system can provide more details. In one example, information types can include Procedures, Overviews, Instructions, Tasks, Tips, Examples, Concepts and Reference. Additional levels of menus can be shown to a user who requires further information regarding a particular information type, for example, as can be seen in FIG. 3.

Returning to FIG. 2, when a user selects one of the information types, an associated topic in the help system will be launched or the user will be shown another successively more detailed cascading menu of information. Help authors can tailor the help topics to a user's anticipated needs. This tailoring will reduce the user's need to search through an entire help system for the particular topic, which he or she needs to complete a task. Additionally, menus of information types, rather than the specifics of the information itself are valuable, as the menus reduce the need for a user to differentiate between types of information. A user who does not know what a particular topic is can read the Concepts information type. A user who needs to use or work a particular topic will use the Tasks information type. Other users need only an Example information type, etc. These information types inherently reduce the knowledge burden placed on a user by breaking information into smaller chunks. The assistance windows of the present invention provide a way to organize and retrieve these chunks automatically.

Figure 4:
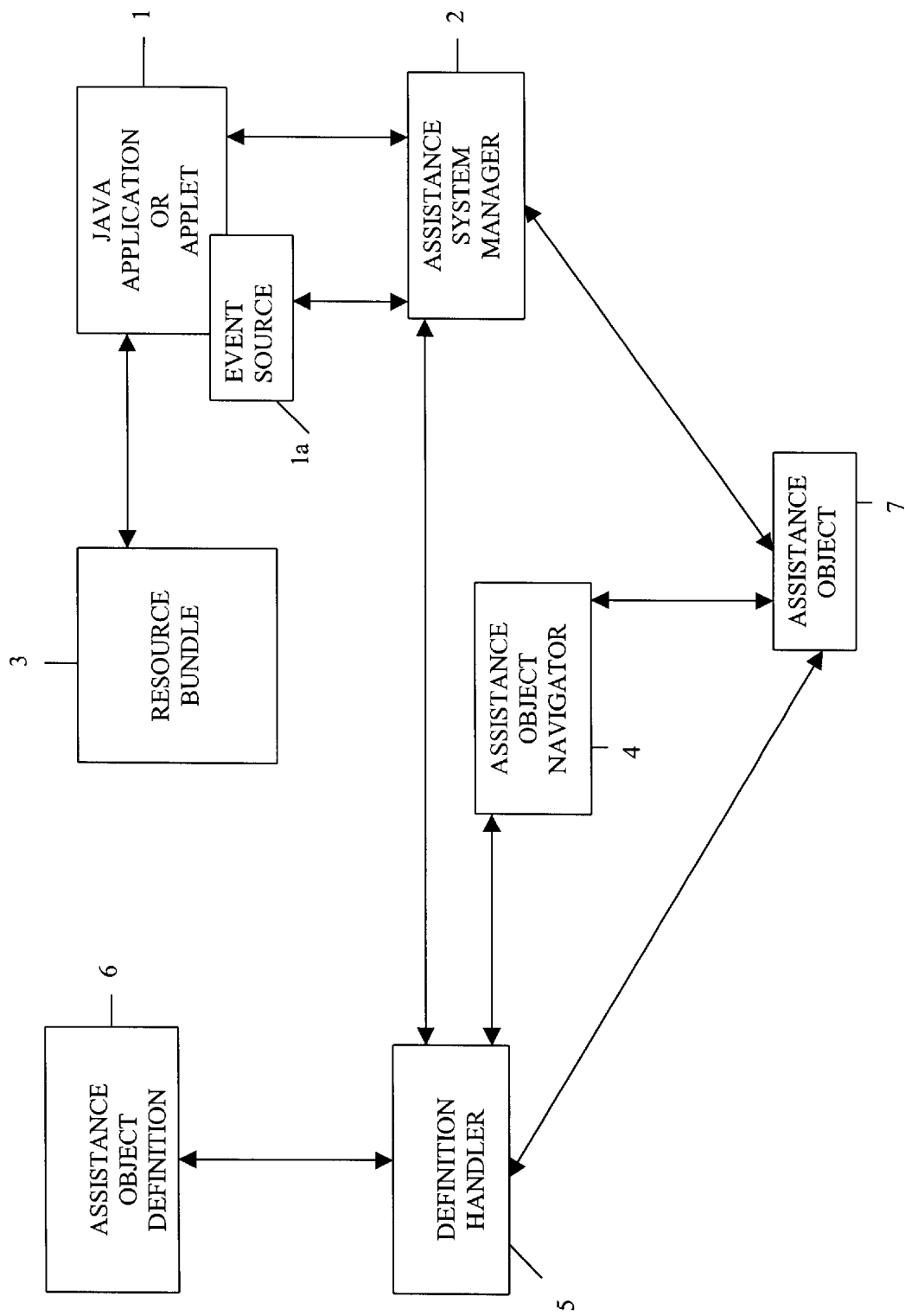
FIG. 4 shows an example architecture upon which an embodiment of the present invention may be practiced.
Figure 5:
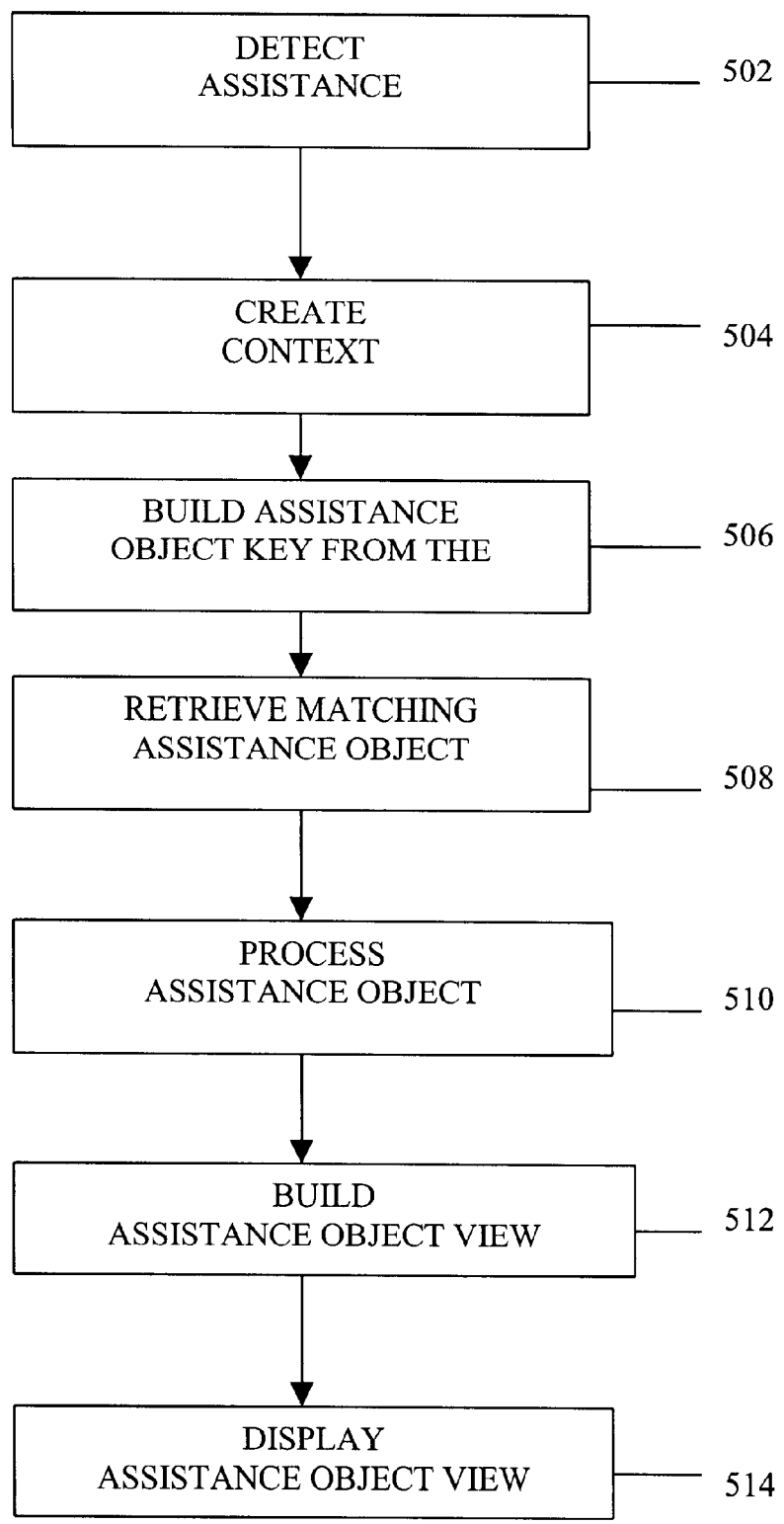
FIG. 5 shows a flow chart of steps followed in implementing an embodiment of the present invention.

The architecture in which assistance windows of the present invention may be created and the step by step process of providing user assistance in accordance with the present invention will now be discussed. This discussion will be presented in conjunction with FIG. 4, showing the architecture, and FIG. 5, showing the method steps. In the following discussion, a single digit reference number refers to FIG. 4 and a three digit reference number refers to FIG. 5.

Initially, in Step 502, the Application or Applet 1, which provides the interface to a user of the system, detects and sends an Assistance Event indication to the Assistance System Manager 2. As discussed above, an Assistance Event might be initiated by a user hovering over a particular button or field for a predetermined length of time, thereby signaling a pause and potential confusion by the user who, thus, may require assistance. Alternatively, the Assistance Event might be initiated by another type of mouse event such as a user mouse-click at a particular location on the GUI, or through other means, such as use of the <F1> function key, for example.

Subsequently, in Step 504 a Context Object is created by the Assistance System Manager 2 to determine the context of the user within the Application or Applet 1. This Context Object can be created in one of two ways. First, the Context Object can be created from a ShortKey, provided to the Assistance System Manager 2 from the Event Source 1*a* of the Application or Applet 1. The Event Source 1*a* is the component in a GUI which owns the Assistance Event. For example, a "Help" button, which is a component, might own a mouse-click event. The content of the ShortKey is provided to the Event Source 1*a* as the content of a client property, which may be populated by Resource Bundle 3, or which may be derived from other information. This client property contains a string of text from the window in the GUI associated with the component. For example, the ShortKey for the OK button would be "OK." If no string is available, then the property contains the type of control plus a concatenated numeric identifier. The number is not arbitrary, but rather, is based on the control's top to bottom and left to right position within the window. Second, the Context Object can be created dynamically from information such as the event type, the window in which the Assistance Event occurred and the control type (e.g. the type of GUI control such as a button, radio button or text field or other derived information). The ShortKey allows the Assistance System Manager 2 to determine a user's context in cases where it is not desirable to determine context dynamically.

The Context Object is then used by the Assistance System Manager 2 in Step 506 to dynamically build an Assistance Object Key. The Assistance System Manager 2 can also dynamically derive any other information, other than the Context Object, which it needs to build the Assistance Object Key. Such other information might include the user's experience level (e.g. beginner, intermediate, experienced) or the user's usage history.

Essentially, the Assistance Object Key is composed of unique identifiers, which together, specify a unique location within an application or the Assistance Event. For example, the Assistance Object Key "DB2.SystemManager.NewUserDialog.Jbutton.OK"
specifies the OK button in the New User window, which is part of the System Manager for DB2.

Since each Assistance Object Key is built "on the fly" when an event that launches the Assistance System Manager occurs, this allows help system authors to tailor a help system based on a user's behavior. This design also allows help system authors to update a help system's navigation model and content based on user feedback simply by replacing definition files, discussed in further detail below. This is possible since the code for the help system is separate from application code.

The Assistance Object Key can further be viewed as a semantically meaningful object. The object is derived such that meaning can be determined by the code and need not be managed like help identifiers used in traditional systems. In such traditional systems, identifiers, or IDs are usually numbers, which are hard coded, rather than dynamically built, as in the present invention. For example, an ID in a traditional system is usually an arbitrary number, such as 256, corresponding to a help topic, which is usually a file. With long lists of "D:topic" pairs, it becomes difficult to manage a help system. For example, an "ID:topic" list might contain hundreds of entries similar to the following:

/*ID:topic*/
  100:afile.htm
  200:bfile.htm
  300:cfile.htm
  400:dfile.htm
  500:efile.htm Such lists are very difficult for a human to "read." Typically, a single person must dedicate time to essentially memorizing and maintaining such a list. Then the team developing a product dependent on the list becomes very dependent on the person maintaining the list to fix problems with the help system.

By contrast, the present invention replaces the numbered IDs with the semantically meaningful objects (Assistance Object Key), discussed above. For example, a format for an Assistance Object Key might be as follows:

YourApplication.ASpecificWindow.ASpecificControlInTheWindow.
TheTypeOfControl.AnInformationType:AnHTMLFileName In such a case the Keys could be as follows:
DB2.CreateUser.UserName.TextField.Task:CreateUser.htm#UserName
DB2.CreateUser.Password.TextField.Tip:CreateUser.htm#Password
DB2.CreateUser.Permissions.ListBox.Example:CreateUser.htm#Permissions
DB2.CreateUser.OK.Button.Task:GenericOK.htm
DB2.CreateUser.Close.Button:GenericClose.htm In this listing, for example, "DB2.CreateUser.Close.Button" is a semantically meaningful object. A person need only know the syntax to understand any "object:helpfile" listing. Additionally, help authors, with knowledge of the syntax, can easily and correctly anticipate the content of the Keys.

In Step 508, the Assistance Object Key is sent by the Assistance System Manager 2 to the Definition Handler 5. The Definition Handler 5 then retrieves an Assistance Object Definition corresponding to the Assistance Object Key from the Assistance Object Definition Source 6. The Assistance Object Definition can be an XML file that defines the content of each instance of an Assistance Object View or, alternatively, can be files stored in a DBMS. A system might have many of these files. The Definition Handler 5 subsequently determines the type of Assistance Objects which need to be built.

In Step 510, the Definition Handler 5 processes the retrieved Assistance Object Definition and passes the processed information either to the Assistance Object Navigator component 4 or to the Assistance Object component 7, depending upon the determination of the type of Assistance Objects the Definition Handler 5 determined were to be built. An Assistance Object Navigator is an intermediate Assistance Object which provides a navigation menu for the Assistance Objects. The Assistance Objects provide the actual assistance information.

In Step 512, the chosen one of the Assistance Object Navigator component 4 and the Assistance Object component 7 dynamically builds the appropriate Assistance Object View, the Assistance Object Navigator or the Assistance Object, respectively. It is to be noted that the Assistance Object Navigator can lead to Assistance Objects, by the user selecting one of the navigation menu items.

In Step 514, the Definition Handler 5, passes a reference to the Assistance System Manager which references whatever Assistance Object View was built in step 512. The Assistance System Manager 2 adds the Assistance Object View to the Application or Applet 1 and displays it to the user.

Steps 502–514, as just described, can be said to be executed along a long path. An alternative embodiment of the present invention allows for execution along a short path. In this alternative embodiment, Steps 502–506 are carried out as discussed above. However, subsequently, the Assistance System Manager 2 uses the Assistance Object Key to retrieve an associated pre-existing Assistance Object. An associated Assistance Object View is then directly launched from the Assistance Object component 7. This path might be followed when the Assistance Event is, for example, the user pressing a "Help" Button, since the user's exact location in the Application or Applet 1 is easily discernible and the type of assistance that the user expects is clear. In other words, since the event provides sufficient information, the retrieval of definition information, etc. along the long path is not needed. This is different from a mouse hover event where the user's exact location may not be so easily discernible and the type of assistance that the user expects is not as clear, in which case, the long path may be followed. The key difference between the long path and the short path is that in the long path, the assistance object view is dynamically built, whereas in the short path the assistance object view is pre-existing.

As discussed above, traditional help models, relying upon identifiers, require a hard map in the code for the help system. This is not amenable to dynamic responses and changes. This can be called forward-looking context sensitivity, because the application knows its "context" as an identifier and then passes this identifier forward to the help system. This model is error prone, and requires a great deal of work and coordination between application developers and help systems authors to implement.

By contrast, the present invention uses retrospective context sensitivity. This retrospective context sensitivity takes advantage of work that developers must already do, thereby reducing the investment required to deliver context sensitive help. The present invention also reduces the problems associated with systems using identifier-based, forward looking context sensitivity. This is so because in the present invention, the application does not transmit, and therefore, cannot misidentify, its context. Prior to creating an assistance window, the Assistance System Manager of the present invention looks back at the application that created the assistance window and determines the context. The Assistance System Manager dynamically figures out the context and builds an appropriate assistance window, unlike traditional help systems where the help engine waits to be told the context.

In summary, the present invention provides several advantages over prior systems. In particular, the present invention provides proactive, dynamic, context sensitive user assistance, as well as retrospective context sensitivity, where the code to provide user assistance is distinct from the application code.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of providing assistance to a user of an application program running on a computer system, the method comprising the steps of:
   (a) determining when a user needs assistance by monitoring events indicating user activity;
   (b) proactively determining a context object identifying the context of the user in the application program, wherein said context object comprises information obtained from a Graphical User Interface (GUI) control;
   (c) dynamically building an assistance object key using the context object; and
   (d) displaying an assistance object view to the user based on the assistance object key.

2. The method according to claim 1, wherein the assistance object view presents an assistance navigation menu listing one or more categories of information.

3. The method according to claim 1, wherein the assistance object view presents one or more assistance objects.

4. The method according to claim 2, further comprising the step of:
   (e) progressively displaying cascading levels of the assistance navigation menu.

5. The method according to claim 1, wherein a meaning of the assistance object key is readily apparent from a name of the assistance object key.

6. The method according to claim 1, wherein the step of determining when a user needs assistance comprises the step of
   (a)(i) detecting when a mouse event occurs in an interface window of the application program.

7. The method according to claim 1, wherein the step of dynamically determining the context object comprises the step of retrieving a context key indicating the context of the user in the application.

8. The method according to claim 1, wherein the step of dynamically determining the context object comprises the step of dynamically determining the user's context in the application program.

9. The method according to claim 1, wherein after step (c), the method further comprises the steps of:
   (c)(i) retrieving an assistance object definition associated with the assistance object key from an object definition repository; and
   (c)(ii) using information derived from the assistance object definition to dynamically build the assistance object view.

10. The method according to claim 2, wherein the categories of information provide links to the assistance objects.

11. The method according to claim 2, wherein the categories of information include procedures, overviews, tips, tasks, examples, concepts and reference.

12. The method according to claim 9, wherein the object definition repository is a repository of Extensible Markup Language (XML) files.

13. The method according to claim 9, wherein the object definition repository is a Database Management System (DBMS).

14. The method according to claim 1, wherein code for providing assistance to the user of the application is independent from code for the application program, such that the code for providing assistance to the user may be modified without having to modify the code for the application program and code for the application program may be modified without having to modify the code for providing assistance to the user.

15. A method of providing assistance to a user of an application program running on a computer system, the method comprising the steps of:
   (a) determining when a user needs assistance by monitoring events indicating user activity;
   (b) proactively determining a context object identifying the context of the user in the application program;
   (c) dynamically building an assistance object key using the context object;
   (d) retrieving a pre-existing assistance object associated with the assistance object key; and
   (e) displaying an assistance object view associated with the assistance object to the user, wherein said assistance object view comprises an interactive wizard.

16. A computer system for providing assistance to a user of an application program, the computer system comprising:
   (a) a system manager for determining when a user needs assistance by monitoring events indicating user activity, proactively determining a context object identifying the context of the user in the application program, wherein said context object comprises information obtained from a Graphical User Interface (GUI) control, and dynamically building an assistance object key using the context object; and (b) a display for displaying an assistance object view to the user based on the assistance object key.

17. The computer system according to claim 16, wherein the assistance object view presents an assistance navigation menu listing one or more categories of information.

18. The computer system according to claim 16, wherein the assistance object view presents one or more assistance objects.

19. The computer system according to claim 17, wherein the display progressively displays cascading levels of the assistance navigation menu.

20. The computer system according to claim 16, wherein a meaning of the assistance object key is readily apparent from a name of the assistance object key.

21. The computer system according to claim 16, wherein the system manager determines when a user needs assistance by:

(a)(i) detecting when a mouse event occurs in an interface window of the application program.

22. The computer system according to claim 16, wherein the system manager dynamically determines the context object by retrieving a context key from a source in the application program indicating the context of the user in the application.

23. The computer system according to claim 16, wherein the system manager dynamically determines the context object by dynamically determining the user's context in the application.

24. The computer system according to claim 16, further comprising:

(c) an assistance object definition repository for storing assistance object definitions; and (d) a definition handler for retrieving one of the assistance object definitions associated with the assistance object key from the assistance object definition repository, the assistance object key having been provided to the definition handler by the system manager; and (e) wherein information derived from the assistance object definition is used to dynamically build the assistance object view.

25. The computer system according to claim 17, wherein the categories of information provide links to the assistance objects.

26. The computer system according to claim 17, where the categories of information include procedures, overviews, tips, tasks, examples, concepts and reference.

27. The computer system according to claim 24, wherein the object definition repository is a repository of Extensible Markup Language (XML) files.

28. The computer system according to claim 24, wherein the object definition repository is a Database Management System (DBMS).

29. The computer system according to claim 16, wherein code for providing assistance to a user of the application program is independent from code for the application program, such that the code for providing assistance to a user may be modified without having to modify the code for the application program and the code for the application program may be modified without having to modify the code for providing assistance to the user.

30. A computer system for providing assistance to a user of an application program, the computer system comprising:

(a) a system manager for determining when a user needs assistance by monitoring events indicating user activity, proactively determining a context object identifying the context of the user in the application program, wherein said context object comprises information obtained from a Graphical User Interface (GUI) control, dynamically building an assistance object key using the context object and retrieving a preexisting assistance object associated with the assistance object key; and (b) a display for displaying to the user an assistance object view associated with the assistance object.

31. A program storage device readable by a computer, tangibly embodying a program of instructions executable by the computer to perform method steps for providing assistance to a user of an application program running on a computer system, the method comprising the steps of:

(a) determining when a user needs assistance by monitoring events indicating user activity;

(b) proactively determining a context object identifying the context of the user in the application program;

(c) dynamically building an assistance object key using the context object; and (d) displaying an assistance object view to the user based on the assistance object key, wherein said assistance object view comprises an interactive wizard.

32. The program storage device according to claim 31, wherein the assistance object view presents one of an assistance navigation menu listing one or more categories of information.

33. The program storage device according to claim 31, wherein the assistance object view presents one or more assistance objects.

34. The program storage device according to claim 31, further comprising the step of:

(e) progressively displaying cascading levels of the assistance navigation menu.

35. The program storage device according to claim 31, wherein a meaning of the assistance object key is readily apparent from a name of the assistance object key.

36. The program storage device according to claim 31, wherein the step of determining when a user needs assistance comprises the step of (a)(i) detecting when a mouse event occurs in an interface window of the application program.

37. The program storage device according to claim 31, wherein the step of dynamically determining the context object comprises the step of retrieving a context key indicating the context of the user in the application.

38. The program storage device according to claim 31, wherein the step of dynamically determining the context object comprises the step of dynamically determining the user's context in the application program.

39. The program storage device according to claim 31, wherein after step (c), the method further comprises the steps of:

(c)(i) retrieving an assistance object definition associated with the assistance object key from an assistance object definition repository; and (c)(ii) using information derived from the assistance object definition to dynamically build the assistance object view.

40. The program storage device according to claim 32, wherein the categories of information provide links to the assistance objects.

41. The program storage device according to claim 32, where the categories of information include procedures, overviews, tips, tasks, examples, concepts and reference.

42. The program storage device according to claim 39, wherein the object definition repository is a repository of Extensible Markup Language (XML) files.

43. The program storage device according to claim 39, wherein the object definition repository is a Database Management System (DBMS).

44. The program storage device according to claim 31, wherein code for performing the steps of the method is independent from code for the application program, such that the code for providing assistance to a user may be modified without having to modify the code for the application program and the code for the application program may be modified without having to modify the code for providing assistance to the user.

45. A program storage device readable by a computer, tangibly embodying a program of instructions executable by the computer to perform method steps for providing assistance to a user of an application program running on a computer system, the method comprising the steps of:

(a) determining when a user needs assistance by monitoring events indicating user activity;

(b) proactively determining a context object identifying the context of the user in the application program, wherein said context object comprises information obtained from a Graphical User Interface (GUI) control;

(c) dynamically building an assistance object key using the context object;

(d) retrieving a pre-existing assistance object associated with the assistance object key; and (e) displaying an assistance object view associated with the assistance object to the user.

* * * * *